United States Patent [19]

Mykkanen

[11] Patent Number: 4,611,511
[45] Date of Patent: Sep. 16, 1986

[54] ELECTRICIAN'S TOOL

[75] Inventor: C. Fred Mykkanen, Minneapolis, Minn.

[73] Assignee: Honeywell Inc., Minneapolis, Minn.

[21] Appl. No.: 655,790

[22] Filed: Oct. 1, 1984

[51] Int. Cl.⁴ .............................................. H02G 1/12
[52] U.S. Cl. ....................................... 81/9.44; 30/90.6
[58] Field of Search ................... 81/9.4, 9.44; 30/90.1, 30/90.6, 90.7, 90.8, 91.1

[56] References Cited

U.S. PATENT DOCUMENTS

| 2,704,000 | 3/1955 | Miller | 30/90.6 |
| 2,778,255 | 1/1957 | Miller | 30/90.6 |
| 4,026,017 | 5/1977 | Arnold | 30/90.6 |

FOREIGN PATENT DOCUMENTS 597657  5/1934  Fed. Rep. of Germany ....... 30/90.7

Primary Examiner—James L. Jones, Jr.
Attorney, Agent, or Firm—R. W. Jensen

[57] ABSTRACT

A wire stripping tool in which a pair of coplanar baldes have parallel cutting edges which do not close completely, and which bridge a pair of notches jointly defining a cylindrical space.

1 Claim, 3 Drawing Figures

ELECTRICIAN'S TOOL

FIELD OF THE INVENTION

This invention relates to the field of hand tools, and particularly to tools useable by electricians in stripping the insulation from the ends of conductors and connecting the conductors by crimping. A tool of this general nature is shown in Neff U.S. Pat. No. 3,654,647

SUMMARY OF THE INVENTION

The present invention comprises an improvement in wire stripping tools which produces a square end to the insulation and prevents distortion of the outer surface thereof, without the possibility of nicking or otherwise damaging the conductor itself. The invention is most efficiently used in operations where a single size of wire is being used.

Various advantages and features of novelty which characterize the invention are pointed out with particularity in the claims annexed hereto and forming a part hereof. However, for a better understanding of the invention, its advantages, and object attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DETAILED DESCRIPTION OF THE PREFERRED EMBODIMENT

Figure 1:
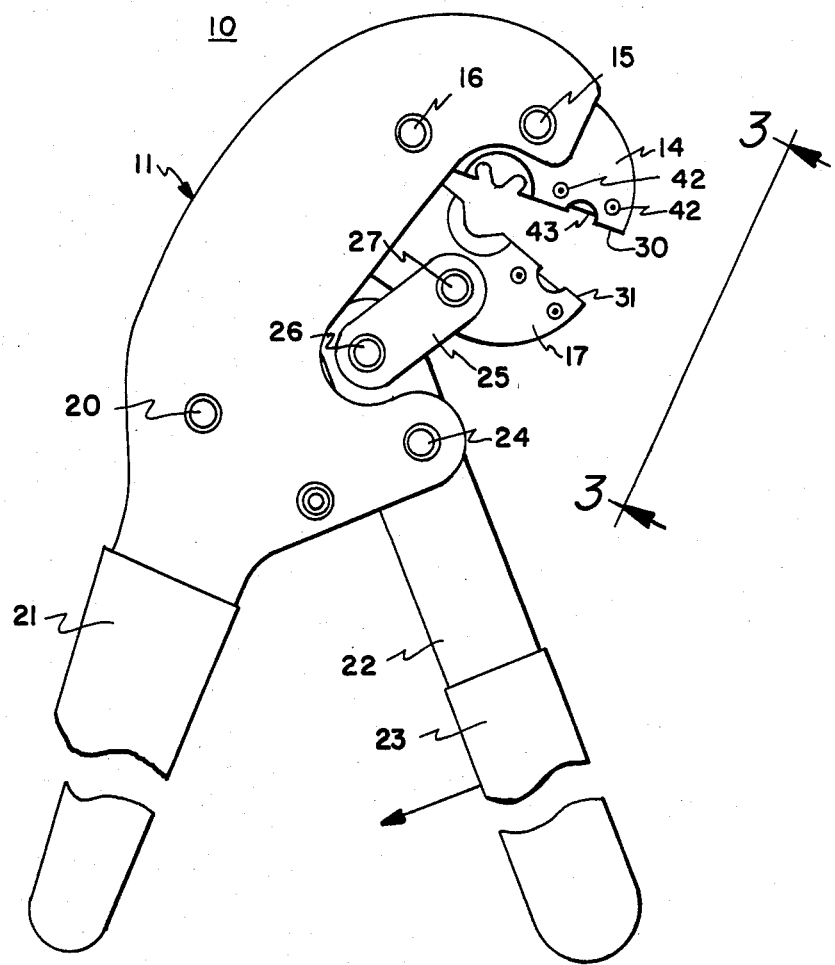
FIG. 1 shows a tool according to the invention.
Figure 2:
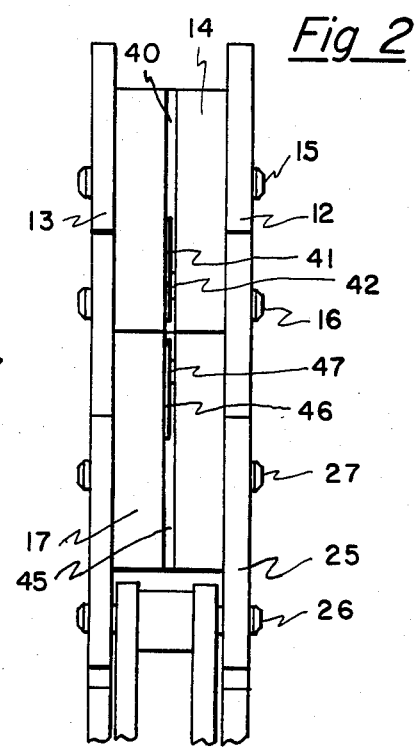
FIG. 2 is a fragmentary view of the tool as seen from the line II—II in FIG. 1.

As shown in the drawing, my tool 10 comprises a frame 11 made up of two spaced plates 12 and 13. A fixed jaw 14 is secured between plates 12 and 13 by fasteners 15 and 16, and a moveable jaw 17 is pivoted to jaw 14 between plates 12 and 13 at fastener 16. The plates are further secured together by a spacing fastener 20, and a suitable handgrip 21 covers the ends of plates 12 and 13 remote from jaw 14.

An operating lever 22 is also provided at one end with a handgrip 23, and is pivoted in frame 11 at a fastener 24. Lever 22 is pivotally connected to jaw 17 by a link 25, at fasteners 26 and 27, so that the jaws are relatively moveable between an open position, shown in FIG. 1, and a closed position, shown in FIG. 3.

Figure 3:
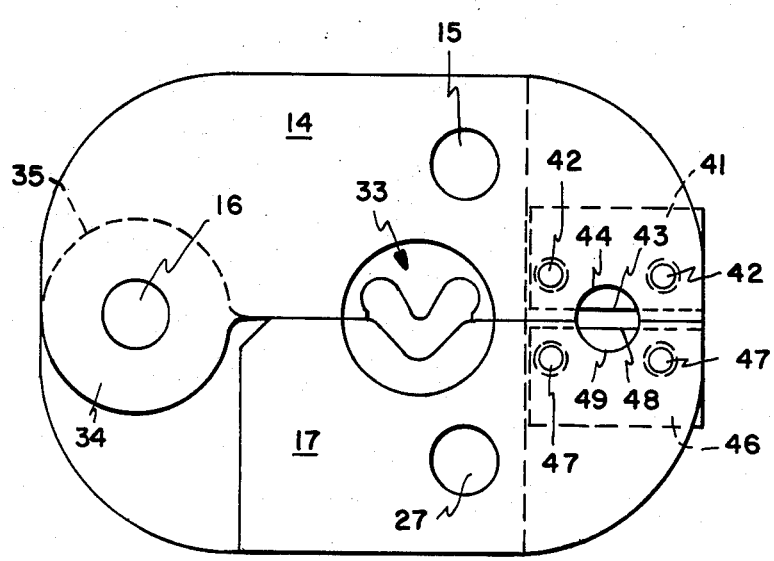
FIG. 3 is an enlarged view of a set of jaws used in the tool and embodying the invention.

Jaws 14 and 17 have surfaces 30 and 31 respectively which jointly define a mating plane in the closed position as shown in FIG. 3. The jaws are configured as at 33 to perform a known crimping function, and are formed with ears 34 and 35 to enable jaw 17 to pivot on fastener 16. The end of jaw 14 remote from pivot fastener 16 is formed with a slot 40 in which a cutting blade 41 is secured by fasteners 42: blade 41 has a rectalinear cutting edge 43. Jaw 14 has a semicylindrical notch 44 which is partially bridged by blade 41. Similarly, the end of jaw 17 remote from pivot fastener 16 is formed with a slot 45 in which a second cutting blade 46 is secured by fasteners 47: blade 46 has a rectilinear cutting edge 48 and partially bridges a semicylindrical notch 49 in jaw 17. In the closed position of jaws 14 and 17 blades 41 and 46 are made coplanar by adjustment of fastener 42, and notches 44 and 49 coact to define a cylindrical space the diameter of which is the same as the outside diameter of an insulated conductor from which the insulation is to be stripped. Blades 41 and 46 are fastened in jaws 14 and 17 so that their cutting edges are parallel, and in the closed position they are spaced by a distance equal to the diameter of the conductor within the insulation.

OPERATION

In use an insulated wire from the end of which the insulation is to be removed is placed between jaws 14 and 17, which are then closed. Blades 41 and 46 penetrate the insulation but do not reach the conductor to nick it. Now if pressure on the handgrips is slightly relaxed, the tool can be rotated by 90 degrees about the wire, completely severing the insulation squarely without nicking the conductor, so that the insulation ends in a square cut as is desirable for crimping interconnections. A lateral force exerted by the user on the tool now strips the insulation from the conductor. It is to be particularly noted that during the rotary motion between the tool and the wire notches 44 and 49 closely engage the insulation surface and prevent the insulation from being torn or distorted.

From the above it will be evident that I have invented a tool which can be used to strip insulation from a conductor squarely without damage to the conductor itself.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. In a tool for use in stripping insulation of a first diameter from conductors of a second diameter, in combination:

a frame;

a first jaw fixed in said frame and a second jaw pivoted in said frame about a first axis for movement into and out of a closed position relative to said first jaw, said jaws having surfaces for defining a mating plane and having notches arranged in apposition to jointly define, in said closed position, a substantially cylindrical space of substantially said first diameter, with its axis lying in said mating plane and extending generally parallel to said first axis;

means for causing pivotal movement of said second jaw in said frame;

a pair of plane cutting blades each having a rectilinear cutting edge;

and means mounting said blades severally in said jaws, substantially midway along said cylindrical space, to extend across said notches in a common plane orthogonal to said axis of said space, so that in said closed position of said jaws said edges are substantially parallel and spaced by a distance equal to said second diameter, and said cylindrical space extends axially in both directions from said blades, to prevent distortion of both cut ends of said insulation during operation of said blades.

* * * * *